Nov. 25, 1941.   F. A. KRUSEMARK   2,264,164
SAFETY TUBE
Filed Dec. 23, 1938   2 Sheets-Sheet 1

INVENTOR.
Frederick A. Krusemark,
BY
ATTORNEY.

Nov. 25, 1941.　　F. A. KRUSEMARK　　2,264,164
SAFETY TUBE
Filed Dec. 23, 1938　　2 Sheets-Sheet 2

INVENTOR.
Frederick A. Krusemark,
BY
ATTORNEY.

Patented Nov. 25, 1941

2,264,164

UNITED STATES PATENT OFFICE 2,264,164

SAFETY TUBE

Frederick A. Krusemark, Chicago, Ill.

Application December 23, 1938, Serial No. 247,334

11 Claims. (Cl. 152—342)

This invention has to do with tubes generally used in vehicle tires, particularly for tires of automobiles, aeroplanes, motorcycles and other such vehicles. More specifically, this invention relates to that form of inner tube generally known as a safety tube, which has a plurality of air chambers so arranged that when one of the air chambers is punctured or blows out, another air chamber supports the wheel of the vehicle until it can be safely brought to a stop.

Multiple chamber innertubes have been known for many years. Most of these have entirely failed to function in actual use. Very few of them have been commercially successful. These few have had serious objections of being impractical, cumbersome, expensive, hard to mount and undesirable from one standpoint or another. Among other objections, they have been difficult to manufacture and difficult to repair in case of damage to them during operation.

It is a feature of the present invention to provide an innertube which overcomes the above-mentioned objections.

It is another object to provide an inner tube having a plurality of air chambers, generally two, interconnected by means whereby air is substantially equalized in the air chambers in normal operation, but is retarded or prevented from passing from an inflated air chamber to another air chamber which has been deflated by puncture or blow-out, or other injury while the tube is in use on a moving vehicle.

Another feature and object of the present invention is to provide a multiple air chamber tube which when inflated will expand to fill the tire with no appreciable movement of the tube in its outer wall portion adjacent the bead of the tire.

It is an object to so construct this tube that this last mentioned condition will obtain even though there is a blow-out or puncture, until the tube becomes deflated to where it will no longer support the tire. This prevents chafing and injuring the tube. In connection with the above object, it may be well to point out that with the change of speed of the car, the pull on the tube at the portion adjacent the bead of the tire varies by reason of variance of the centrifugal force. As a result, previous constructions designed to overcome injury by chafing under conditions above described and in normal operation, have been formed of extra heavy materials and consequently have among other objections, been expensive and cumbersome.

It is an object of the present invention to provide an inner tube having two principal air chambers, the inner chamber being complete but having also a complete outer chamber connected with the inner chamber wherever desired; and having inter-communication means whereby the inflating fluid such as air may pass between the two chambers in normal operation.

It is a further object to provide a construction in which the crown portion and the wall portions of one chamber form at least a part of the wall portions of the other chamber.

It is a further object that where a two-chamber construction is provided, the inner wall portions of the outer chamber may be joined wherever desired by a sheet or strip of tube material, such as fabric and rubber to form the inner air chamber.

It is a still further object to provide, in a construction using two air chambers, an arrangement wherein the inner wall portions of the outer chamber are joined by a sheet or strip of tube material, such as rubber or fabric, which sheet or strip of tube material becomes the base of the inner air chamber, and at least a portion of the inner walls of the outer air chamber become the crown and sidewalls of the inner air chamber.

It is a further object to provide a tube arrangement whereby the multiple air chambers are joined other than and above the base portion of either air chamber. If desired, such joinder may be made by a metal grommet or grommets, or other valve means in that construction where each air chamber is formed of entirely separate units, or in any of the constructions by cementing, vulcanizing, bradding, or otherwise by any means known.

It is another object of the present invention to provide a structure composed of an inner air chamber made up of the general structure and configuration of the single chamber innertube on the market today, and an outer air chamber with its inner and outer walls and crown portion (or portions, as the case may be) in a general way conforming in shape to the crown walls and side portions of the inner air chamber, but being in no wise connected to the inner air chamber at the base portion of either air chamber.

It is a further object of the present invention to provide air chambers of such construction of cord, fabric and rubber, and so shaped as to insure each air chamber maintaining the proper shape and position when in operation to prevent chafing and friction on any of the other air chambers when the tube is properly inflated.

It is an object to provide suitable cord and fabric composition with the rubber to control the distortion of the various tubes by air pressure and by centrifugal force and other force to prevent excessive wear and undesirable distortion.

It is an object to provide a tube forming an outer air chamber somewhat crescent-shaped in cross-section having communications with the other air chamber or chambers, the base portions of the outer chamber having circumferential cords whereby the outer chamber will be maintained in relative position although the inner air chamber is rapidly inflated. This will eliminate the necessity of slowly inflating the inner air chamber, since the outer chambers can assume their normal operating positions within a short while after proper inflation when the cords are provided for the base portions of the outer air chamber.

It is an object to provide a tube so constructed that when desired the rapid inflation of the inner air chamber, causing it to move down and out of normal operation with the outer air chamber, will not cause an undesirable injury to the wall of the outer air chamber but will permit temporary non-injurious distortion that should come back into alignment after a short while in normal operation and when the outer air chamber is properly inflated.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

Figure 1:
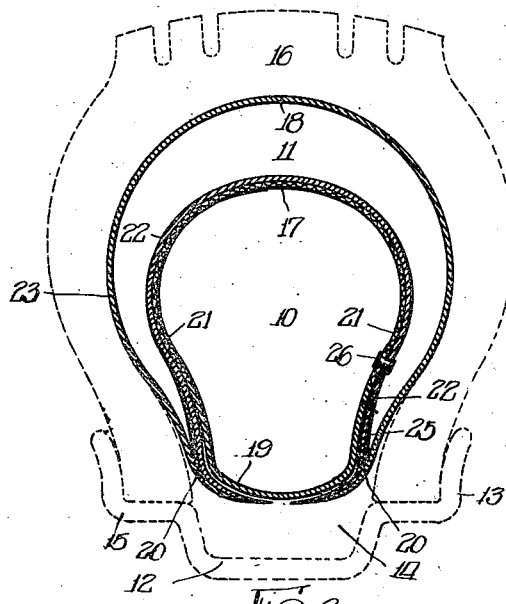
Figure 1 is a cross-section of a tube embodying the features of the present invention, showing with broken lines the outer casing or tire, and the rim, and indicating how the tube would appear after being mounted but before substantial inflation draws it down into the well of the rim.
Figure 2:
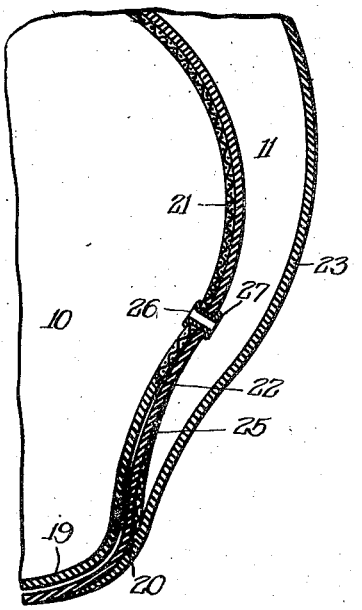
Figure 2 is a fragmentary cross-sectional view of the tube shown in Figure 1.
Figure 7:
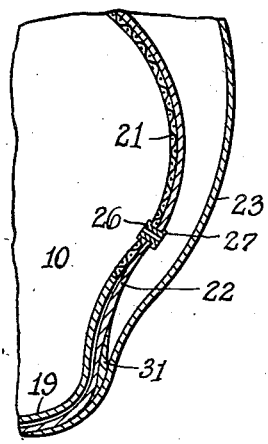
Figure 7 is a view similar to Figure 2, but illustrating the reinforcing strip for the inner side wall of the outer air chamber as rubber, rather than rubberized fabric as in Figure 2.

In Figures 1 and 2 in particular and as is apparent for certain parts in other figures the walls 22 are constructed primarily of rubber in the nature of the material used in the ordinary inner tube on the market today. This is also true of the crown 18 and sidewalls 23. In some of the figures, rubber wall 22 is supplanted by a rubberized fabric wall 22a. The rubber sidewall 22 preferably has a reinforcing strip 25, see Figures 1 and 2 in particular, of rubberized fabric. In Figure 7, the reinforcing strip is of rubber and has been renumbered 31. The construction 22a is clearly illustrated in Figures 3 and 4. This strengthens the protection to the inner air chamber at that portion of the tube that might be subject to blow-outs because of injury caused by hitting the curbing of streets, as is frequent in parking an automobile in the city. The base 20 of the outer air chamber may or may not be provided with cords 24 as best shown in Figure 5. If provided, these cords are ordinarily placed at a position adjacent the bead position of the tire. They serve several very useful purposes, one of which is to retain the portions of the outer tube adjacent the beads of the tire substantially in place regardless of the rate of inflation. In other words, these cords are circumferential and exert a uniform tension holding the base of the outer tube firm upon inflation which causes the crown portion and sidewalls of the outer air chamber to move up and fill the tire at the same time the inner air chamber particularly the base moves down into the well. This means that upon rapid inflation resulting in the inner air chamber moving into place, it is not necessary to wait several minutes for the air to seep through the valve or grommet 26 before operating the tire. The base 19 will expand sufficiently to enable the inner air chamber, which it is contemplated will have some expansion, to fill the tire. As the outer air chamber fills with air, the inner air chamber will come to a position of balance where it rides clear of the outer air chamber and without undue stress on any portion. This means that the crown 17 (or 17a as the case may be) or sidewall 22 (or 22a as the case may be) will not touch the crown 18 in ordinary operation unless there is a puncture or blow-out causing loss of pressure as when the outer air chamber 11 fails.

In the subject matter hereof, I have referred to inner and outer air chambers. Where it may be necessary I have referred to the combined air containing portion and structural parts as "air chamber structures," and where it is desired to particularly specify the portion filled with air as distinguished from the structural portions I have referred to it as "air chamber portion or portions." It will be understood that sometimes these may be also designated as inner and outer tubes in some of the constructions, and it is believed that reference to the various parts as inner and outer air chambers, describing the various parts of each in the terms of tube portions will not cause any confusion. Where I may use or have used the word "tube" for the air chambers, unless clearly inapplicable this should be considered interchangeable with "air chamber structure" and simply "air chamber." Corresponding parts of the various figures are referred to by corresponding numbers Referring more in detail to the various construction shown in the drawings, 10 designates the inner air chamber. I have shown only a second air chamber which is herein designated outer air chamber 11.

In the construction shown in Figure 1, the drop center rim 12 has the flange 13, the well 14 and the ledge 15. The tire casing 16 is shown in dotted lines.

In all of the figures, 17 designates the crown portion of the inner air chamber if constructed of rubberized fabric, and 17a if constructed of rubber, 18 the crown portion of the outer air chamber, 19 the base of the inner air chamber, and 20 the base of the outer air chamber. It will be noted that because of the peculiar, usually somewhat crescent, shape of the outer air chamber, it has two base portions. Both of these are designated 20. I have provided the side wall portions 21 of the inner air chamber, if made of rubberized fabric, or 21a if made of rubber.

Figure 3:
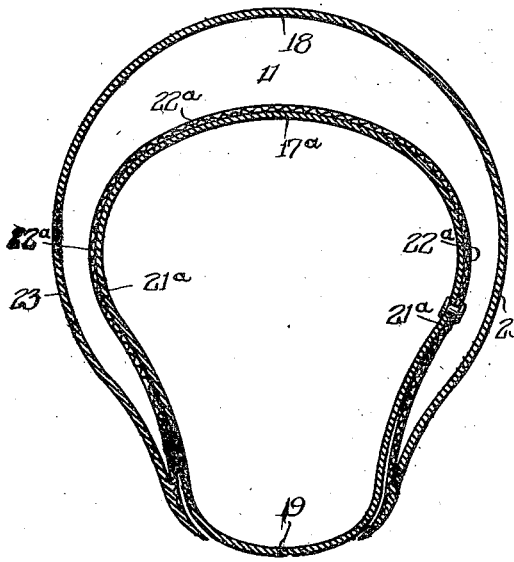
Figure 3 is a cross-sectional view of a tube of slightly different construction than that shown in Figure 1. In this figure as well as the other figures with the exception of Figure 1, the casing and rim are not indicated.

As shown in Figures 1, 2, 3 and in a somewhat different arrangement, 4 and 5 there are provided the inner walls 22 or 22a and the outer side wall 23. The side walls 22 or 22a usually follow closely the contour of the crown 17 (or 17a, as the case may be) and the side walls 21 (or 21a as the case may be) in the construction shown in Figures 1, 2, 3 and 7.

It will be noted that in any or all of the constructions shown, the base 20 of the outer air chamber may extend a substantial distance past the bead position, to give additional protection to the base 19 of the inner air chamber. It is not essential, however, that this be done and the base 20 may even terminate above the position adjacent the bead of the tire.

In the constructions shown in Figures 1, 2, and 3, the sidewalls 22 (or 22a as shown in Figure 3) may be fastened to the sidewalls 21 (or 21a as shown in Figure 3) and crown portions 17 (or 17a as shown in Figure 3) at any place desired. Preferably, however, any joinder of the two air chambers would be above their respective bases. The joinder may be by vulcanizing, cementing, or metal brads. As clearly indicated in Figure 2, the flanges 27 of the grommet 26 may extend out sufficiently to exert a holding action against the sidewalls 21 and 22. In event they were not joined, other than by grommet flange, it seems entirely feasible that in event of injury to the crown 18 or sidewall 23 of the outer air chamber 11, a new outer air chamber could be readily substituted.

Figure 4:
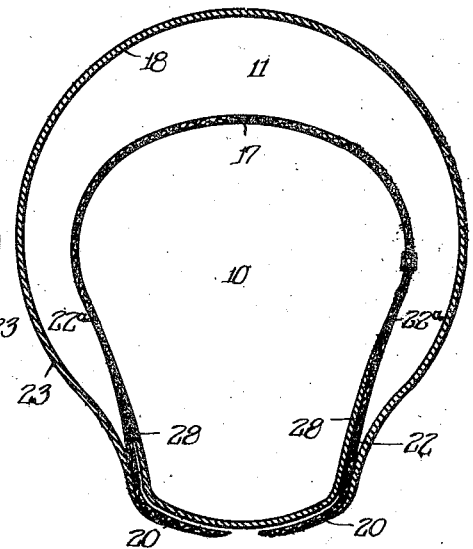
Figure 4 is a cross-sectional view of a modified construction of safety tube embodying the features of this invention.
Figure 5:
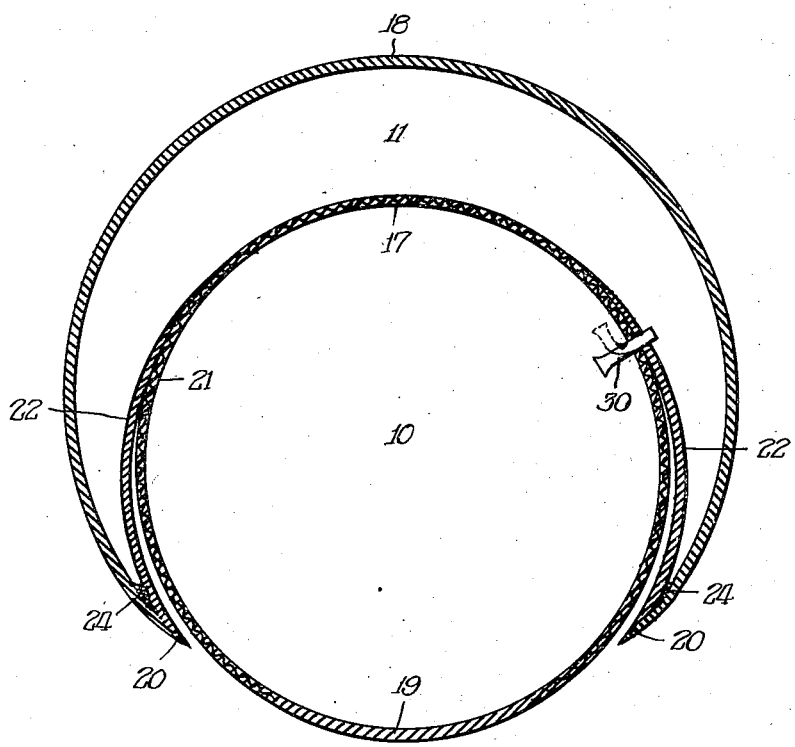
Figure 5 is a view similar to that of Figure 4, but showing a slightly modified construction.

In the construction shown in Figure 4, the panel 28, which is preferably composed of rubber to allow for a stretching action, when needed (the material of the ordinary innertube in use today probably being satisfactory for the purpose, although a slightly heavier construction may be needed), is attached, preferably by vulcanizing, cementing, or the like circumferentially to the inner wall 22a of the air chamber 11, above the bases 19 and 20 of both air chambers. This panel then extends down and becomes at its lower portion the base 19 of the inner air chamber 10. In this way, the sidewall 21 (or 21a) is eliminated and the wall 22a becomes the dividing wall between the two air chambers, performing the functions of the crown 17, sidewalls 21, and sidewalls 22a. In a construction of this type, the wall 22a is preferably rubberized fabric with enough plies to withstand the shock and carry the load in event of a blow-out.

Referring to Figure 5, the inner air chamber 10 is composed of a unit comparable to the ordinary innertube of today. Above the base 19, I have joined the sidewalls 22. The sidewalls 21 and crown 17 in such case are preferably reinforced, above the base at least, with fabric so as to strengthen them in the way the wall 22a was strengthened, as shown in description of Figure 4. In Figure 5 the side wall 22 is preferably of rubber or material which will yield, rather than a heavy fabric construction.

The various constructions shown may have the bead 24 eliminated for the purpose of enabling the sidewall 22 (or 22a as the case may be) to fold over adjacent the base 20, and between the last point of joinder with the inner air chamber. This fold permits the outer air chamber to move up away from the inner air chamber. In this arrangement, it may be desirable to widen the side wall 22 (or 22a as the case may be) thus causing the base 20 to extend a little further over the base 19. This will cause the base 20 to stay adjacent or below a line above the outer edge of the tire bead. Of course the tire bead is of no concern except when the tube is mounted and in operation. One particular advantage of this is that it permits "curing" of the tube complete in one rapid operation, and eliminates the necessity of "curing" the portions of the air chambers on the "inside" in an additional operation to the curing of the outer circumference.

While there is absolutely no intention of limiting the protection secured on this invention, except as may be done in the claims, I have shown several preferable arrangements of the material. Since the behavior and performance of the tube as a whole is related to the combinations of material used in the various portions, I have set forth the constructions that appear more feasible. The availability of other materials and other arrangements of these materials in the style or relative positions illustrated, is, of course, obvious from the disclosures herein.

Figure 6:
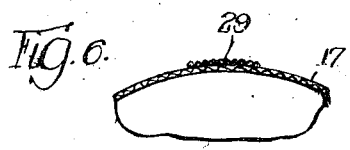
Figure 6 is a fragmentary cross-sectional view of the outer circumferential portion of the inner air chamber showing a construction using cords to strengthen the tube against distortion, particularly by centrifugal force.

Referring to Figure 6, I have illustrated an arrangement whereby cords 29 can be used to advantage to strengthen the crown 17, or inner wall 22, against moving out of position due to centrifugal force. The exertion of centrifugal force which increases with speed is a serious question since movement of the tube into a position where the crown 17, or (in the proper construction) the inner wall 22, will contact the crown 18, will result in excessive heat, friction and chafing of both tubes. The cords 29 are preferably circumferential.

The valve 30 illustrated in Figure 5 may be used in place of the grommet 26. It is so constructed that the portions pressing through the sidewall or walls, as the case may be, between the inner and outer air chamber, is strong enough to withstand collapse at that point. By providing a flexible material, sufficiently flexible in the center to bend easily under centrifugal force, caused by rotation of the tube, and yet sufficiently strong to straighten out to open up and form a passage between the two air chambers, when not acted upon by centrifugal force, a closing action entirely closing, or at least partly closing, the opening through the valve, will be had. For this purpose, it is usually desirable that the valves 30 be tubular and extend some distance at least, into the inner air chamber, and have the end portion opposite that passing through the walls of the tubes, somewhat heavier than the flexible center portion, to secure a greater pull, and thus bending force, by centrifugal action.

In its normal operation, the tube having the two air chambers is mounted on the rim much in the style shown in Figure 1. The tube is then inflated by the regulation valve extending through the rim and into the inner air chamber 10. When this inflation is rapid, the air chamber 10 will immediately move down into the well 14 of the rim, the expansion of the base 19 being instrumental in accomplishing this purpose. It is not ordinarily necessary to wait until the outer air chamber 11 fills with air to proper pressure in the construction shown in the various figures, the air will filter slowly through the grommet 26 or the valve 30 (although very little air will filter through while the tire is moving where the valve 30 is used) and inflate the outer air chamber 11. The inner air chamber 10 then reaches a position where there is little or no pressure on the side walls and crown and will ride in that position until some injury permits the air to leave the outer air chamber 11. Immediately the plies of the inner air chamber 10 "take the load" and maintain the tire at least until the vehicle is brought to a stop.

The base 20 adds considerable protection from injury by the rim and the bead of the tire to the inner air chamber.

The grommet 26 in the preferred embodiment will have an opening sufficient to permit the air to move slowly from the chamber 10 into the chamber 11. Additional grommets may be provided as desired.

It is understood that where circumferential cords are not provided in the base 20, with the outer air chamber having its wall 23 of a length to fit closely around the walls 22 and 21 (or 22a and 21a as the case may be) or either of them as the case may be, inflation, causing the air chamber to fill the tire, may double over the side wall 22 at a position above the base 20 and the doubled over condition may maintain even during operation. It seems that this would not be particularly objectionable since there is no great amount of strain at these points and the advantages gained especially in rapid curing of the tube, would be such as to off-set any objections.

It is understood in connection with the valve means 30, that this valve means will work perfectly if placed in the crown portion 17, particularly if one side of the end of the valve means 30 is made of heavier material or weighted somewhat as respect to the other side of the same end.

While I have herein shown and described certain features of my invention, still I do not wish to limit myself thereto, except as I may do so in the claims.

I claim:

1. A safety tube comprising an inner tube with crown, side wall and base portions and an outer tube generally crescent-shaped in cross-section, said outer tube overlying the inner tube at least in the crown and side wall portions and having a plurality of base portions in no wise connected with the base portion of the inner tube and adapted to maintain their relative operating position upon inflation regardless of movement of the inner tube, said base portions of the outer tube having circumferential beads, and the outer and inner tube having at least one air passage between their chambers through which substantial equalization of pressure is obtained under normal operating conditions.

2. An inner tube comprising an inner air chamber, and an outer air chamber, said outer air chamber surrounding the crown portion and the side wall portions of the inner air chamber, and having a plurality of base portions, the inner air chamber having an independent base portion, the structure forming the inner air chamber being separated from the structure forming the outer air chamber circumferentially below a position substantially above the bases of the two chambers, and the inner and outer air chamber being joined at a position substantially above their said bases, whereby said base portions are substantially independent of each other, the base of the inner air chamber extending inwardly past the base portions of the outer air chamber in normal operating arrangement.

3. An innertube comprising in combination outer air chamber structure with side walls, crown and a plurality of base portions, and an inner air chamber structure in which the crown and at least a portion of the side walls are comprised of and identical with inner side walls of the outer air chamber structure, said inner air chamber structure and said outer air chamber structure being separate from each other at their respective base portions and being joined above their respective base portions.

4. An innertube comprising in combination an inner air chamber structure with a base portion, side walls and crown portion, and an outer air chamber having outer side walls, a crown portion and a plurality of base portions, and having at least a portion of its inner side walls composed of and identical with the crown of the inner air chamber, the base of the inner air chamber structure being separate from the bases of the outer air chamber structure, said air chamber structures being joined to each other above their respective base portions.

5. An innertube comprising a plurality of air chamber structures, the outer air chamber structure having two base portions extending below at least the upper part of the base portion of the inner air chamber, the inner air chamber having a base portion which in normal operation extends at least as far inwardly as the base portions of the outer air chamber, each air chamber being separated from the other at its base portion, and being joined to the other air chamber above its base portion, intercommunicating means between the air chambers, said inner air chamber by reason of the two air chambers being separated at their bases, being free to move inward irrespective of the movement of the outer air chamber when placed in normal operation.

6. A safety tube comprising in combination an inner and an outer air chamber joined above their respective base portions, the inner air chamber having a base formed of rubber material, said base in normal operation extending at least as far below the place of joinder as any base of the outer air chamber, at least a portion of the side walls and crown of said inner air chamber formed of fabric materials having substantially no elasticity, said outer chamber having the crown, side walls and base portions of rubber material, the base portions of the outer air chamber structure extending below any place of joinder of the structures forming the inner and outer air chambers, at least a portion of the inner side walls of the outer air chamber being formed of a crown portion and a portion of the side walls of the inner air chamber structure.

7. A safety tube comprising in combination an inner air chamber structure having a base portion, and an outer air chamber structure having a plurality of base portions, said air chamber structures being separated in their respective base portions, and being joined to each other above their respective base portions, and one or more cords in each of the base portions of the outer air chamber structure, said cords being arranged substantially circumferentially of the safety tube, whereby the bases of the outer air chamber structure are held against outward movement in normal operation, regardless of movement of the inner air chamber structure.

8. A safety tube comprising an inner air chamber structure with crown, side wall and base portions, and an outer air chamber structure generally crescent shape in cross-section, said outer air chamber structure overlying the inner air chamber structure at least in the crown and side wall portions, and having a plurality of base portions, the structures being such that the base portions of the two air chambers are each separate from the other air chamber, the air chambers being joined above their respective base portions, and means comprising circumferential cords positioning the base portions of the outer air chamber structure when in normal operation against movement outwardly regardless of movement of the inner air chamber structure.

9. A safety tube comprising in combination two air chamber structures, one of said air chamber structures being an inner air chamber structure and the other being a generally crescent-shaped in cross-section outer air chamber structure having a plurality of base portions, and substantially overlying the inner air chamber structure except the base portion of the latter, the inner and outer air chamber structures being separated below their respective base portions and being separated at their base portions, said inner and outer air chamber structures being joined above their base portions, inter-communicating passage for air between the two air chambers.

10. A safety tube comprising in combination a plurality of air chamber structures, with a total of three base portions, one of said air chamber structures being an inner air chamber structure with a single base portion, and the remaining air chamber structure fitting over the inner air chamber structure in an arrangement generally crescent-shaped in cross-section, intercommunicating means between said air chamber structures, whereby air passes from the inner air chamber into the other air chamber structure, the base portions of the air chamber structures being separate, and the air chamber structures being joined in an area above the respective base portions.

11. A safety tube with inner and outer peripheries, said tube comprising in combination two air chamber structures, one of said air chamber structures being an inner air chamber structure, and the other being a generally crescent-shaped in cross-section outer air chamber structure having a plurality of base portions, the inner and outer air chamber structures being separated a substantial distance above their base portions and being separated at their base portions, said inner and outer air chamber structures being joined circumferentially above their base portions, intercommunicating means for the passage of air between the two air chambers, the air chamber portions of the outer air chamber structure extending toward the inner periphery to a position substantially adjacent the portion of the tube adjacent the bead area of a tire, when said tube is in a tire and in normal operation, and the air chamber portion of the inner air chamber structure extending inwardly at least as far as the air chamber portion of the outer air chamber structure, when in normal operation.

FREDERICK A. KRUSEMARK.